United States Patent
Theis et al.

(10) Patent No.: US 8,596,591 B2
(45) Date of Patent: Dec. 3, 2013

(54) VERTICAL SPRING LIFT SYSTEMS

(75) Inventors: John Theis, St. Paul, MN (US); Saeb Asamarai, Columbia Heights, MN (US); Peter Segar, Burnsville, MN (US)

(73) Assignee: Ergotron, Inc., St. Paul, MN (US)

( * ) Notice: Subject to any disclaimer, the term of this patent is extended or adjusted under 35 U.S.C. 154(b) by 217 days.

(21) Appl. No.: 12/944,966

(22) Filed: Nov. 12, 2010

(65) Prior Publication Data

US 2011/0278414 A1 Nov. 17, 2011

Related U.S. Application Data

(60) Provisional application No. 61/261,061, filed on Nov. 13, 2009, provisional application No. 61/261,083, filed on Nov. 13, 2009.

(51) Int. Cl.
- A47F 5/00 (2006.01)
- A47F 7/00 (2006.01)
- F16M 11/00 (2006.01)
- F16M 13/00 (2006.01)

(52) U.S. Cl.
USPC ............. 248/125.2; 248/121; 248/122.1; 248/123.11; 248/125.1

(58) Field of Classification Search
USPC ............ 248/414, 328, 329, 330.1, 331, 352, 248/334.1, 338, 125.2, 917–923, 176.3, 248/176.1, 123.11, 125.1
See application file for complete search history.

(56) References Cited

U.S. PATENT DOCUMENTS

| | | | |
|---|---|---|---|
| 3,756,585 A | 9/1973 | Mihalcheon | |
| 4,220,053 A | 9/1980 | Barlow et al. | |
| 4,253,350 A | 3/1981 | De Tarr | |
| 4,494,177 A | 1/1985 | Matthews | |
| 5,037,059 A | 8/1991 | Asano et al. | |
| 5,054,162 A | 10/1991 | Rogers | |
| 5,706,739 A | 1/1998 | Shaheen et al. | |
| 6,113,046 A | 9/2000 | Wang | |
| 6,994,306 B1 | 2/2006 | Sweere et al. | |
| 6,997,422 B2 | 2/2006 | Sweere et al. | |
| 7,032,870 B2 | 4/2006 | Sweere et al. | |
| 7,506,853 B2 | 3/2009 | Sweere et al. | |

(Continued)

FOREIGN PATENT DOCUMENTS

| | | |
|---|---|---|
| WO | 2004018927 A1 | 3/2004 |
| WO | 2005012783 A2 | 2/2005 |
| WO | 2006036889 A2 | 4/2006 |

OTHER PUBLICATIONS

International Search Report and Written Opinion for International Application No. PCT/US2010/056457, dated Jan. 14, 2011, 15 pages.

(Continued)

*Primary Examiner* — Amy J Sterling
(74) *Attorney, Agent, or Firm* — Fredrikson & Byron, P.A.

(57) ABSTRACT

A display positioning apparatus is provided for lifting, supporting, and/or positioning a load, such as a display. The apparatus includes a support and a bracket adapted to couple to a display movably coupled to the support along a range of travel. A balance mechanism is operatively coupled to the bracket and support to counterbalance the bracket and display. In some cases the balance mechanism includes a torquing spring member operatively coupled with a cam member to provide a substantially constant counterbalancing force along the range of travel.

18 Claims, 14 Drawing Sheets

(56) References Cited

U.S. PATENT DOCUMENTS

| | | | |
|---|---|---|---|
| 7,628,371 B2 * | 12/2009 | Gan et al. | 248/422 |
| 8,091,841 B2 * | 1/2012 | Jones et al. | 248/125.2 |
| 8,191,497 B2 * | 6/2012 | McCudden et al. | 116/173 |
| 8,236,927 B2 * | 8/2012 | Stange | 530/345 |
| 8,267,360 B2 * | 9/2012 | Su | 248/123.11 |
| 2004/0250635 A1 | 12/2004 | Sweere et al. | |
| 2005/0034547 A1 | 2/2005 | Sweere et al. | |
| 2005/0139734 A1 | 6/2005 | Sweere et al. | |
| 2005/0184215 A1 | 8/2005 | Lin | |
| 2006/0130713 A1 | 6/2006 | Jones et al. | |
| 2006/0185563 A1 | 8/2006 | Sweere et al. | |
| 2007/0272375 A1 | 11/2007 | Hansen | |
| 2007/0278364 A1 | 12/2007 | Jang | |
| 2008/0026892 A1 * | 1/2008 | Asamarai et al. | 474/84 |
| 2009/0014131 A1 | 1/2009 | Mullet et al. | |
| 2009/0166482 A1 * | 7/2009 | Gan et al. | 248/122.1 |
| 2010/0176254 A1 | 7/2010 | Sweere et al. | |
| 2010/0193653 A1 | 8/2010 | Sweere et al. | |

OTHER PUBLICATIONS

International Search Report and Written Opinion for International Application No. PCT/US2010/056456, dated Jan. 25, 2011, 11 pages.

* cited by examiner

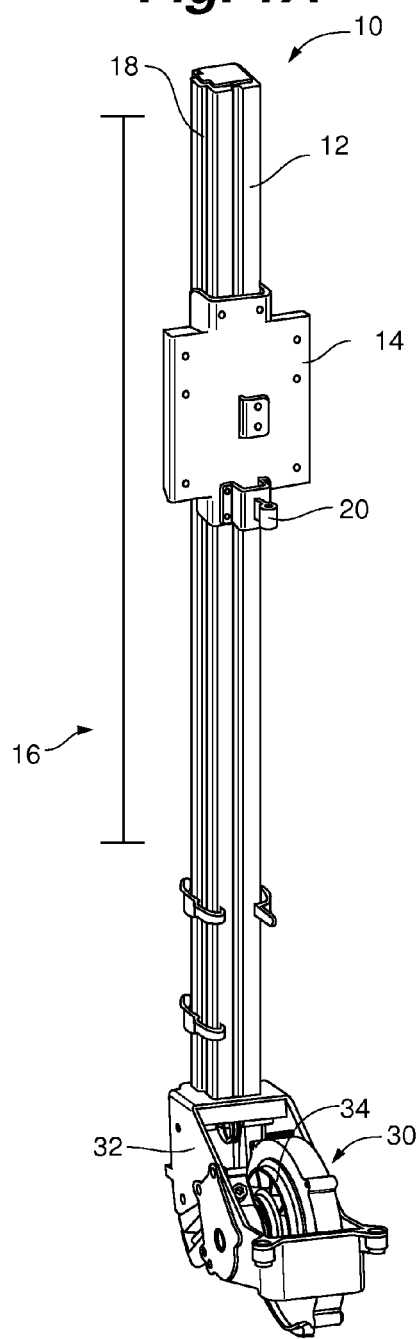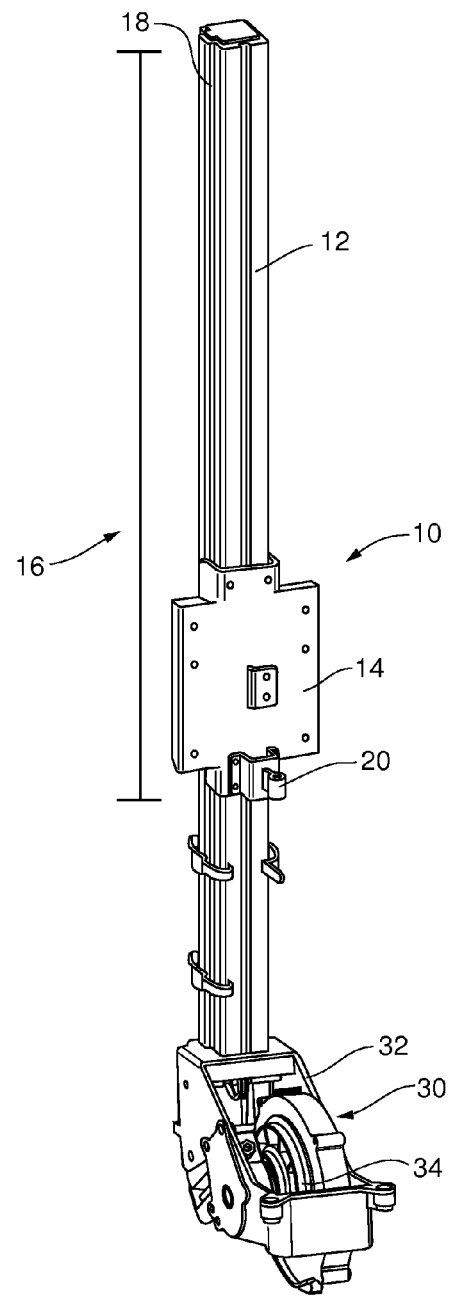

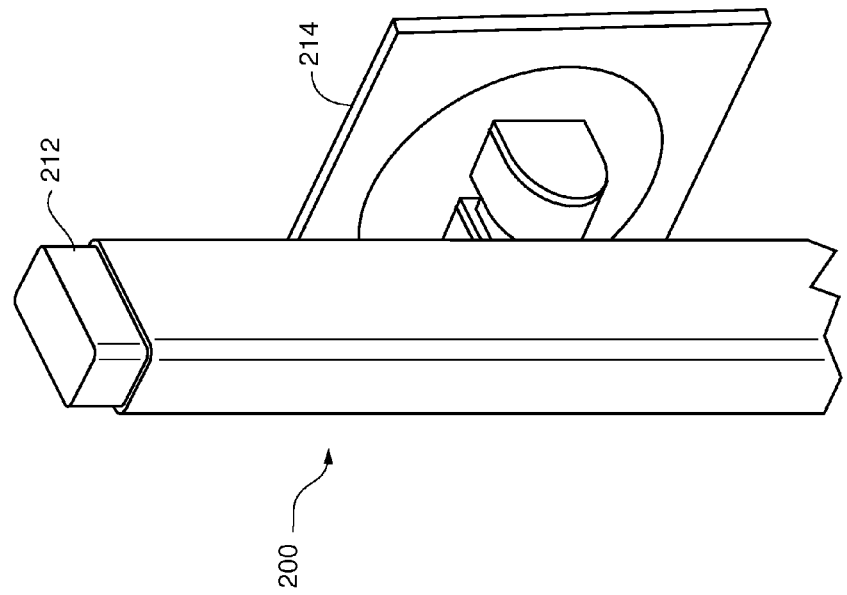
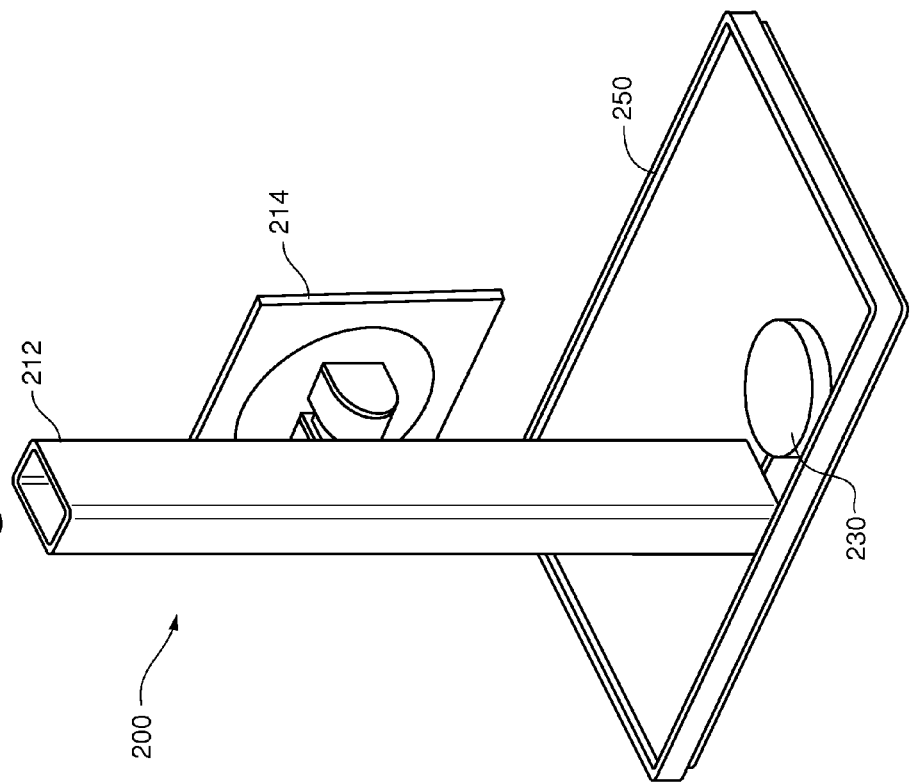

VERTICAL SPRING LIFT SYSTEMS

RELATED APPLICATIONS

This application claims the benefit of U.S. Provisional Application Ser. Nos. 61/261,061 and 61/261,083, both titled Spring Lift Systems, and both filed Nov. 13, 2009, the entire contents of both of which are hereby incorporated by reference.

FIELD

The present invention relates generally to an apparatus for lifting, supporting, and/or positioning a load. In particular embodiments, the invention specifically relates to display positioning assemblies and methods for lifting, supporting, and/or positioning a display with respect to a support surface.

BACKGROUND

In recent years, ergonomic concerns have taken on increased importance due to several factors. For example, workers are often able to be more productive when working in an ergonomically-friendly environment. Moreover, when workers are forced to work in ergonomically unsuitable environments, they may be injured and/or may perform at a substandard level. In addition, ergonomically-friendly consumer products (e.g., computers and monitors/displays, flat screen televisions, etc.) have also taken on an increased importance outside the workplace.

Many tasks involve working with personal computers and/or display monitors. For example, in some jobs personal computers and/or display monitors may be used by multiple operators at different times during a day. In some settings, one computer and/or display may be used by multiple people of different sizes and having different preferences in a single day. Given the differences in people's size and differences in their preferences, a monitor or display adjusted at one setting for one individual may be inappropriate for another individual. For instance, a child would have different physical space needs than an adult using the same computer and monitor.

In many contexts, operators are using computers for longer periods of time, which increases the importance of comfort to the operator. An operator may choose to use the display as left by the previous user despite the discomfort, annoyance, and inconvenience resulting from using settings optimized for another individual. This type of situation may result in substandard performance and even injury after prolonged use.

In some situations, people must perform operations in various postures. For example, one may be required to perform some operations in a seated position and others in a standing position. In such situations, both the seated operations and the standing operations may require the same workstation. Such workstations may include a computer monitor (i.e., display), a keyboard, and/or a mouse.

Moreover, as displays grow in size and weight, ease of adjustability is an important consideration. For displays requiring frequent adjustment, adjustability for displays has been provided using an arm coupled with gas springs, where the arm is hingedly coupled with the desk or a vertical surface. However, the gas springs are costly and the gas may leak out over time. In addition, the gas springs require a significant amount of space, for instance arm length, which can be at a premium in certain applications, such as in hospitals.

SUMMARY

Embodiments of the invention may be implemented in various contexts to raise and lower a multitude of objects. Examples include raising and lowering displays, including video monitors, televisions and computing equipment of all sizes, furniture work surfaces, production assembly tools and lifts, work load transfer equipment, vertically oriented exercise equipment, robot control devices, and windows.

Further, embodiments of the invention may be used to provide forces in orientations other than vertical (e.g., horizontal or angled with respect to vertical). Examples of such applications include, but are not limited to continuous constant force feeding systems for machine tools, horizontally oriented exercise equipment, drawer closing applications, and door closing applications.

Some embodiments of the invention may support a display monitor (e.g., a flat panel display such as an liquid crystal display or plasma display) for a personal computer or television. Some situations may not be conducive to placing personal computers and/or display monitors directly on a desk or on a computer case. In some embodiments, computer displays may be mounted on elevating structures to increase desk space or to respond to the ergonomic needs of different operators. In some embodiments of the present invention, displays may be mounted to a surface (e.g., a wall) instead of placing the display on a desk or a cart.

Embodiments of the invention may provide one or more of the following advantages. For example, embodiments of the invention may provide high reliability at a relatively low cost. Some embodiments may be manufactured and/or maintained in a more cost-effective manner than applications using, for example, electrical motors, hydraulic motors, or gas springs as their power source. To illustrate, some embodiments of the invention use a relatively inexpensive spiral spring which costs considerably less than a gas spring.

Some embodiments of the invention provide a display positioning apparatus including a support and a bracket that is adapted to couple to a display and is movably coupled to the support to allow the position of the display to be adjusted with respect to the support. In some cases the display positioning apparatus includes a balance mechanism that is operatively coupled to the support. The balance mechanism is further coupled to the bracket via an elongated tension member. The balance mechanism counterbalances the bracket and the display to provide adjustment of the display relative to the support. In some embodiments the balance mechanism includes a housing containing a torquing spring member and a cam member for engaging the tension member coupled to the bracket. The torquing spring member has a first end engaged with the housing and a second end rotatable with respect to the housing.

Some embodiments of the invention provide a lift mechanism for positioning a display. The lift mechanism includes a lift column and a bracket movably engaged with the lift column through a range of travel. The bracket is adapted to couple with a display in order to move the display along the range of travel. The lift mechanism further includes a cam member rotatably supported with respect to the lift column. An elongated tension member couples the bracket to the cam member. The cam member has a cam surface for winding the tension member as the cam member rotates in a first direction, and for unwinding the tension member as the cam member rotates in a second direction. The lift mechanism may further include a torquing spring member engaged with the cam member that provides a torque opposing rotation of the cam member to counterbalance the bracket and the display along the range of travel. In some embodiments the torquing spring member comprises a spiral spring.

According to some embodiments, a lift mechanism is provided including a lift column and a bracket movably engaged with the lift column through a range of travel. The bracket is adapted to couple with a display to move the display along the range of travel. An elongated tension member is coupled to the bracket. The lift mechanism includes a balance mechanism rotatably supported with respect to the lift column, which counterbalances the bracket to position the bracket and the display along the range of travel. The balance mechanism includes a housing containing a torquing spring member and having a cam surface that engages the tension member as the housing rotates with respect to the lift column. A first end of the torquing spring member engages the housing and a second end of the torquing spring member rotates with respect to the housing.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 1A is perspective view of a display positioning apparatus in a first position in accordance with an embodiment of the invention.

FIG. 1B is perspective view of the display positioning apparatus of FIG. 1 in a second position in accordance with an embodiment of the invention.

FIG. 16A is a perspective view of a display positioning apparatus in accordance with an embodiment of the invention.

FIG. 16B is a perspective view of a portion of the display positioning apparatus of FIG. 16A in accordance with an embodiment of the invention.

DETAILED DESCRIPTION OF THE PREFERRED EMBODIMENTS

Figure 2:
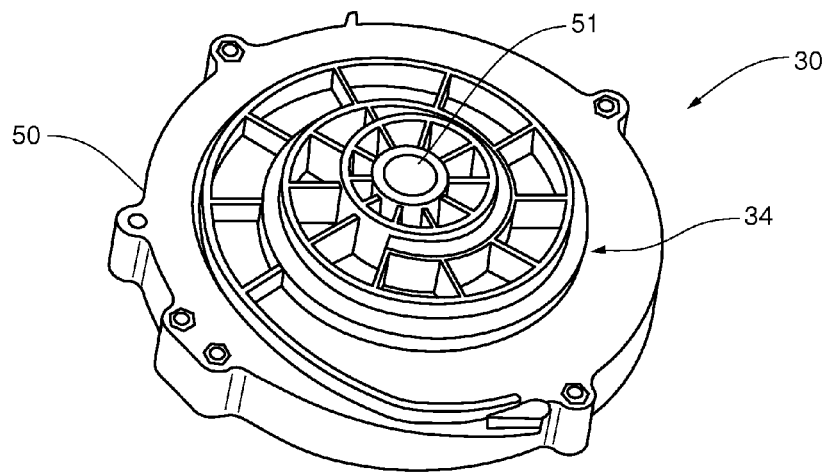
FIG. 2 is a perspective view of a balance mechanism in accordance with an embodiment of the invention.

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Certain embodiments of the invention are directed to mechanisms and systems incorporating one or more spiral springs for lifting, supporting, and/or positioning a load along a range of travel. In some cases, the range of travel includes a vertical portion (e.g., substantially vertical or vertical and horizontal) with respect to a support surface, providing a height-adjustable display positioning apparatus. As discussed further herein, certain embodiments are adapted for positioning and supporting a display, such as a computer monitor, a television, a screen, or other type of display. For example, certain embodiments provide a display positioning apparatus that allows a user to reposition a computer monitor or other display along a range of travel. Certain embodiments of the invention provide monitor lift stands or monitor lift mechanisms. Some embodiments of the invention provide positioning apparatuses and lift mechanisms for positioning objects other than displays. As just one example, some embodiments are directed to height-adjustable computing carts.

FIGS. 1A and 1B are perspective views of a display positioning apparatus 10 in accordance with an embodiment of the invention. The positioning apparatus 10 may take a variety of forms. In the embodiments described herein, the positioning apparatus 10 is illustrated in the form of a lift mechanism, providing height-adjustability for an attached display. The positioning apparatus 10 generally includes a support or lift column 12 and a bracket 14. The bracket 14 is adapted to couple with a display (not shown) such as a computer monitor, television, etc., through the use of one or more fasteners known in the art. For example, the bracket 14 may include a standard Video Electronics Standards Association (VESA) mounting interface for coupling with the display.

The bracket 14 is movably coupled to the lift column 12 through a range of travel 16 to allow the attached display to be positioned at a variety of locations relative to a support surface (not shown). FIG. 1A illustrates the positioning apparatus 10 with the bracket 14 in a first position along the range of travel 16, while FIG. 1B shows the positioning assembly 10 with the bracket 14 in a second position along the range of travel 16. In some cases the bracket 14 is slidingly engaged with the lift column 12. In some embodiments the lift column 12 defines a track 18 and the bracket 14 includes rollers (not shown) adapted to roll along the track 18 through the range of travel 16. In some embodiments, the bracket 14 includes a brake mechanism 20 that can secure the bracket 14 at a particular position along the range of travel 16. For example, in some embodiments the brake mechanism 20 can include a spring-mounted post that engages one of a number of recesses in the lift column 12.

Embodiments of the display positioning apparatus 10 can provide a number of ranges of travel 16 depending upon a specific application of the apparatus. As just a few examples, in cases where the display positioning apparatus is incorporated in a desk stand or desk arm, the range of travel 16 may be relatively short, e.g., 5-7" or 5-13" respectively. In other applications the apparatus may provide a longer range of travel. For example, a standing workstation may provide a range of travel of about 7-13", while a floor stand or computer cart may have a range of travel 16 of approximately 16-20". Of course, these are merely examples of ranges of travel and the invention is not limited to any specific range. In some cases the range of travel 16 may be significantly longer or shorter than those examples discussed herein.

Continuing with reference to FIGS. 1A and 1B, in some embodiments the display positioning apparatus 10 includes a balance mechanism 30 for counteracting forces from the bracket 14 and display (not shown) with respect to the lift column 12. For example, the balance mechanism 30 may provide lift assistance to counter the weight of the bracket and display. In some embodiments, the balance mechanism 30 also balances the weight of the bracket and display with respect to the lift column 12 and the supporting surface.

The balance mechanism 30 is operatively coupled between the bracket 14 and the lift column 12. In some cases the balance mechanism is rotatably coupled and supported by a frame 32 attached to the lift column 12. An elongated tension member (e.g., a line, not shown) couples the balance mechanism 30 to the bracket 14 (e.g., through one or more direction-changing pulleys) and transmits forces between the balance mechanism and the bracket. The tension member can comprise any suitable elongated member capable of transmitting tensile forces between the balance mechanism and the bracket. For example, the tension member can be a line, cord, string, rope, cable, chain, ribbon, belt, or another such member known in the art. Some embodiments of the invention described herein include a tension member with a line configuration. However, it is understood that in some embodiments the line can be replaced with another configuration and that the invention is not limited to any particular form of tension member.

The tension member can be formed of any material known in the art suitable for the desired application (e.g., natural fibers, metal, polymer, single-strand, cable). In some embodiments, to further provide high reliability over a long life at a relatively low cost, the tension member has a line configuration produced from materials including high tensile strength polymers. Such tensile polymers provide greater reliability over a longer useful life than wound metal cables. For example, a typical computer stand mechanism built with a steel cable can break in less than 500 cycles, while an engineered polymer fiber line may exceed 10,000 cycles. Polymeric fibers may comprise, for example, aromatic polyester liquid crystal polymers, amid fibers, or other high tensile strength synthetic fibers woven into a rope configuration.

In some embodiments the balance mechanism 30 includes a torquing spring member (not shown in FIGS. 1A and 1B). The torquing spring member provides a force that counteracts the weight of the bracket 14 and the attached display as they move through the range of travel 16. The torquing spring member may thus provide a degree of lift assistance to a user adjusting the position of the display. Generally, the torquing spring member is a spring or other energy mechanism that provides torque about an axis of rotation. In the embodiments described herein, the torquing spring member is configured as a spiral spring. In some embodiments the torquing member includes a flat strip of material (e.g., metal) with a generally rectangular cross-section wound into a coil with equal or variable space between the coils, where the entire coil resides within a single plane. However, the torquing spring member may be configured as any suitable energy mechanism and it is understood that the invention is not limited to any particular configuration. As just a few examples, the torquing spring member may be a torsion spring, a constant torque spring, or a watch spring. Of course, the torquing spring member may also include other types of springs and energy mechanisms known in the art.

Returning to FIGS. 1A and 1B, in certain embodiments the balance mechanism 30 also includes a cam member 34 coupled to the torquing spring member (not shown). As the balance mechanism rotates with respect to the lift column 12, the cam member 34 engages a line (i.e., the tension member, not shown), and in some embodiments, the cam member 34 and torquing spring member provide a constant force to counterbalance the weight of the bracket 14 and the display throughout the range of travel 16. In some embodiments the torquing spring member and the cam member 34 allow a user to adjust the position of the display throughout the range of travel with a constant force, even with a torquing spring member having a force profile varying with its degree of compression. In some embodiments, the display positioning apparatus 10 provides positioning of the display at an infinite number of positions along the range of travel.

FIG. 2 is a perspective view of a balance mechanism 30 in accordance with an embodiment of the invention. In this embodiment, the balance mechanism includes a housing 50, which contains a torquing spring member in the form of a spiral spring. The spiral spring provides a counterbalancing force for the display positioning apparatus. As shown, the cam member 34 is formed on one surface of the housing 50.

Figure 3:
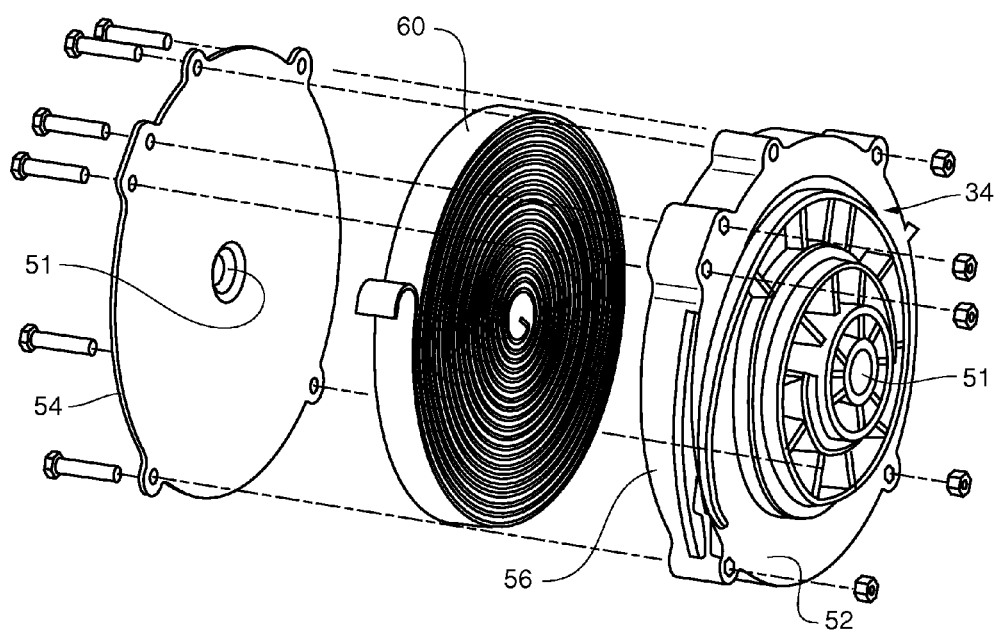
FIG. 3 is an exploded view of the balance mechanism of FIG. 2 in accordance with an embodiment of the invention.

FIG. 3 is an exploded assembly view of the balance mechanism 30 showing the spiral spring 60 positioned side-by-side with the cam member 34 in a compact and space-saving form factor. In some embodiments the housing 50 includes a first end plate 52, a second end plate 54, and a wall 56 coupled together with one or more fasteners 58. As shown, in some embodiments the housing 50 defines a cavity that receives the spiral spring 60. For example, the spiral spring 60 may be contained within the wall 56 of the housing between the first and the second end plates 52, 54. In some embodiments the housing (e.g., the first and second end plates) includes an axle opening 51 that receives an axle for rotating the balance mechanism 30. Of course, the housing 50 may take a variety of forms and one or more portions described herein as individual portions may optionally be integrally formed rather than coupled together through fasteners. In addition, in some embodiments the cam member 34 and the spiral spring 60 may be coupled together without the need for the housing 50 illustrated in FIGS. 2 and 3. For example, the cam member 34 may be incorporated into a wheel that does not contain nor encompass the spiral spring 60. In this case, the cam member 34 and the spiral spring 60 may be coupled together through an additional link, tension member or other structure known in the art.

Figure 4A:
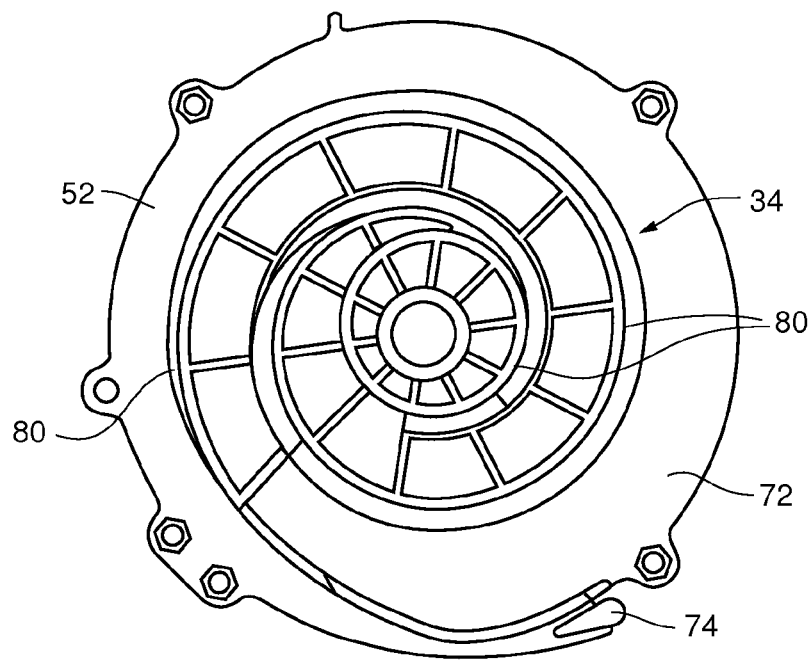
FIG. 4A is an end view of a housing portion including a cam member in accordance with an embodiment of the invention.
Figure 4B:
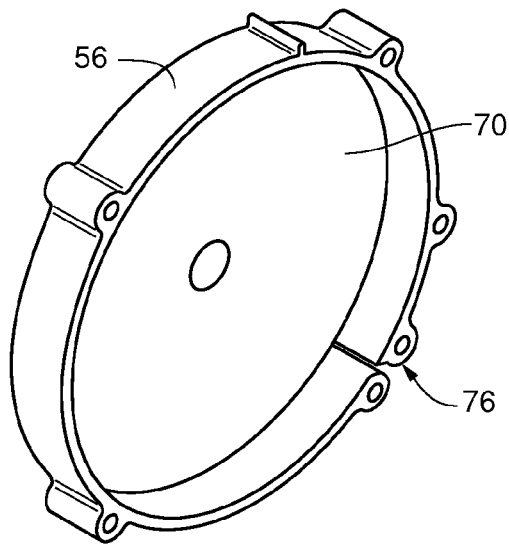
FIG. 4B is a perspective view of the housing portion of FIG. 4A in accordance with an embodiment of the invention.
Figure 4C:
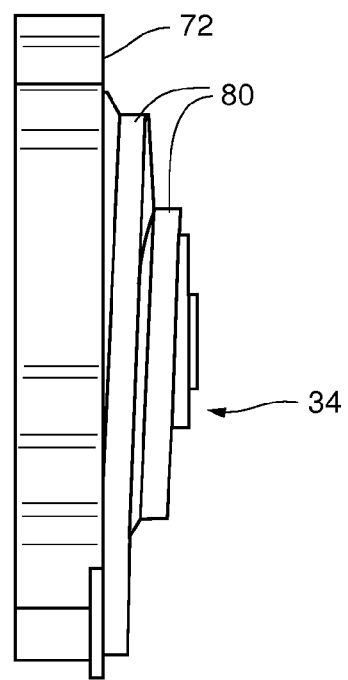
FIG. 4C is a side view of the housing portion of FIG. 4A in accordance with an embodiment of the invention.

FIGS. 4A-4C are views of a portion of the housing 50 including the cam member 34 in accordance with an embodiment of the invention. In this embodiment, the first end plate 52 and the wall 56 of the housing are integrally formed, for example as a cast polymer or metal component. The first end plate 52 includes an interior first surface 70 and an exterior second surface 72 which comprises the cam member 34. In this embodiment the cam member 34 is an integral part of the first end plate 52, although in some embodiments the cam member 34 may be separately formed and coupled to the housing 50. An attachment member 74 is provided to couple the cam member 34 and/or housing 50 to the line (i.e., tension member) that is coupled to the display bracket 14 (FIGS. 1A, 1B). In some cases the attachment member 74 comprises a knob or protrusion around which the line can be fixed. The housing wall 56 also includes an engagement element 76 for engaging the spiral spring 60. In some cases the engagement element 76 comprises a slot in the housing wall that receives an end of the spiral spring, with one or more knobs for arresting movement of the end of the spring.

As shown in FIG. 4A, the cam member 34 includes a cam surface 80 that engages the line coupled to the display bracket. In certain embodiments the cam surface 80 is shaped and contoured so that a variable force applied to the cam member 34 by the spiral spring 60 is transformed into a substantially constant force applied to the line coupled to the cam member 34. Thus, the balance mechanism 30 can incorporate a torquing spring member with a variable force profile, while also providing a substantially constant lift and/or balancing force. The substantially constant lift/balance force provided by this embodiment can provide a display positioning apparatus with adjustability that has increased reliability and predictability, in addition to increased ease of use for a user attempting to adjust the apparatus.

In some embodiments the cam surface 80 is a curved or spiraling surface, extending from an outer diameter to a smaller inner diameter. In some cases the cam surface 80 has a similar or greater length when compared to the range of travel 16, thus providing sufficient length for winding the line as the display bracket moves through the range of travel 16 (FIGS. 1A, 1B). As shown in FIG. 4A, in some embodiments the cam surface 80 spirals or otherwise extends through an angle of 360 degrees or more. The cam surface 80 can thus continually engage the line as the cam member 34 rotates through one or more complete rotations. In certain embodiments the line is coupled to the cam member proximate an outer edge of the cam member and initially engages the cam surface along its outer diameter. As the cam member rotates, the line is wound upon or unwound from the cam surface 80 depending upon the direction of rotation. As shown in FIG. 4C, in some embodiments the cam surface 80 projects outward from the second surface 72 of the housing 50 as it spirals inward to accommodate engagement of the line through more than one full rotation of the cam member 34.

According to some embodiments of the invention, the cam member 34 may be produced from a material comprising nylon, cast aluminum, and/or or glass filled polymers. Examples include, but are not limited to RTP 805 TFE5, which is an acetal material with 30% glass fill and 5% PTFE. These materials may comprise glass within a range of about 10-60%. Moreover, such materials may include nylon, acetal, and POM. These materials provide a sturdy and dependable cam member that will not deform over many cycles at a relatively low cost.

Figure 5:
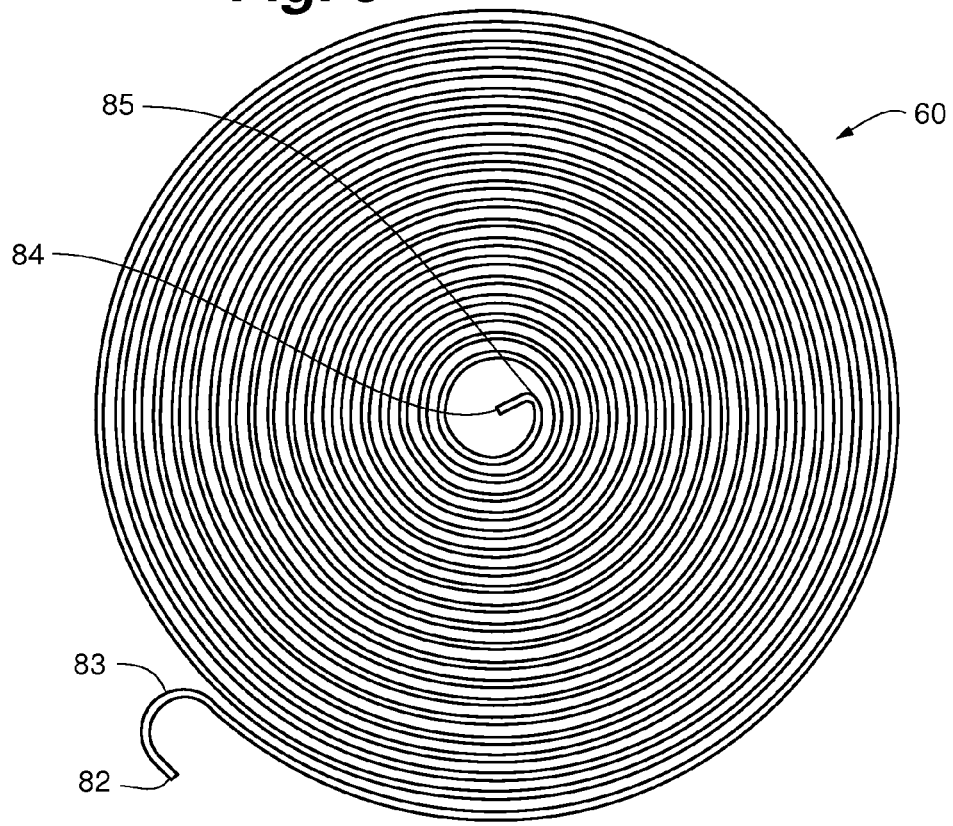
FIG. 5 is a view of a spiral spring in accordance with an embodiment of the invention.

FIG. 5 is a view of the spiral spring 60 in accordance with an embodiment of the invention. According to certain embodiments, the spiral spring 60 comprises a flat wire wound in a spiral from a center or inner diameter to an outer diameter of the spring 60. As seen in FIG. 3, spiral spring 60 has a substantially flat, disk-like configuration in some embodiments. The spiral spring 60 may be configured to counterbalance different loads over varying ranges depending upon the desired application. In some cases the spiral spring 60 can counterbalance loads up to about 200 lbs. The length and width of the spiral spring 60 can vary in different embodiments based on the lift force and range of travel required for a particular application. For example, a flat wire for some spiral springs may be between 4-30 mm wide and 0.5-6 mm thick, and a coiled spring may have a diameter between 15-200 mm. Other sizes and configurations are also possible depending upon the particular embodiment.

As shown in FIG. 5, a first end 82 of the spring near at the outer diameter may include a first bend 83 for coupling with or otherwise engaging the housing 50 or cam member 34. A second end 84 of the spring near the inner diameter can include a second bend 85 for engaging or coupling with an axis of the balance mechanism. Although the spiral spring 60 is shown with bends 83, 85 for engaging surrounding structure, the ends of the spring may additionally or alternatively include other attachment features (e.g., clips, screw or bolt holes) known in the art.

The spiral spring 60 preferably, although not necessarily, includes multiple turns or coils between its inner and outer diameters to facilitate a wide range of travel for the display bracket. In some embodiments the spiral spring 60 is configured so that the first end 82 of the spring is rotated with the cam member about the center of the spring one or more times from the spring's free position. In some embodiments the first end 82 may be rotated several times with respect to the spring's center in order to provide a greater length of travel for the display bracket 14.

Providing the balance mechanism 30 with a torquing spring member configured as a spiral spring provides a number of advantages over existing balancing arrangements. For example, the spiral spring 60 provides a more reliable energy mechanism than a gas-powered spring because gas tends to leak from a gas-powered spring over time, thus leading to decreased performance. A spiral spring can also be considerably less complex and less expensive than a gas-powered spring. The spiral spring 60 configuration also provides advantages over systems including extension or compression springs. For example, in some embodiments the configuration of the spiral spring allows a direct engagement between the spring and the cam member 34 (e.g., through the structure of the housing 50), without the need for secondary lines or other tension members connecting the energy mechanism of the device with the cam member 34. This arrangement simplifies the design of the balance mechanism 30 and avoids problems that can arise from such a secondary tension member. In addition, in some cases the spiral spring can be easier to contain (in the event the spring breaks or becomes uncoupled from the cam member) due to a relatively compact disk-like configuration (e.g., when compared to an extension spring) and radial expansion/compression of the spiral spring 60.

Figure 6:
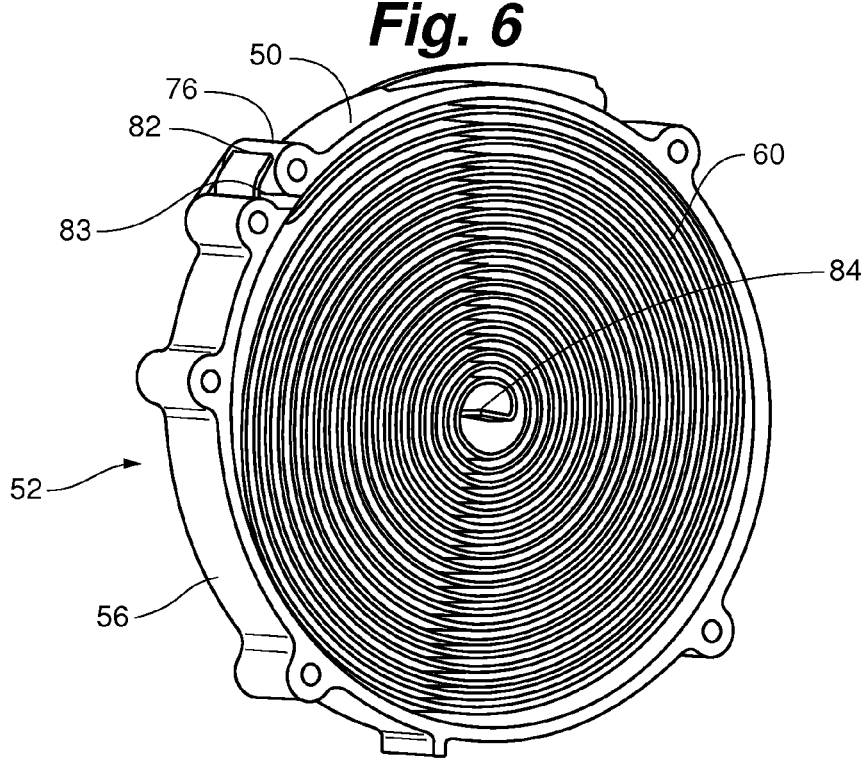
FIG. 6 is a perspective view of a spiral spring mounted within a portion of a housing in accordance with an embodiment of the invention.

FIG. 6 is a perspective view of the spiral spring 60 mounted within a portion of the housing 50 including the housing wall 56 and the first end plate 52. The first bend 83 of the spring is configured to engage with the engagement element 76 of the housing, thus engaging or coupling the outer diameter of the spiral spring 60 to the housing 50, and thus also the cam member 34. In certain embodiments in which the engagement element 76 comprises a slot in the housing wall with one or more knobs, the first end 82 of the spring extends through the slot and the first bend 83 wraps around one of the knobs to engage the spring. In some embodiments the engagement between the spiral spring 60 and the housing/cam member relies on bends in the spring and accompanying frictional forces between the spring and the housing. Other engagement mechanisms are also envisioned, including fasteners and other known devices for engaging the spring with the housing and cam member.

In some embodiments the first end 82 of the spiral spring is engaged with the housing 50 and cam member 34 and the second end 84 of the spring is held in place while the cam member 34 and the housing rotate about an axis of rotation. Rotating the cam member 34 thus also rotates the first end 82 and outer diameter of the spiral spring 60 with respect to the center of the spring, tightening or loosening the spring depending upon the direction of the cam member's rotation. Tightening the spring 60 creates a spring force counteracting rotation of the cam member 34, thus transmitting a counteracting force to the display bracket through the line coupled between the cam member and the bracket.

In some embodiments the second end 84 of the spiral spring 60 is held stationary by an axle extending through the axle opening 51 while the cam member 34 rotates. Although not depicted, it is envisioned that in some embodiments a reverse configuration may be used in which the second end 84 or center of the spiral spring 60 is engaged with and rotates with the cam member and housing, while the first end 82 and the outer diameter of the spring are held stationary as the cam member rotates.

Providing the balance mechanism 30 in a form that easily integrates both the cam member 34 and the spiral spring 60 provides a number of advantages over existing balancing arrangements. For example, positioning the spiral spring 60 in close proximity to the cam member simplifies operative connections between the cam member and energy mechanism used to provide the balancing force. As discussed above, in some embodiments the cam member 34 directly engages with the spiral spring 60 (e.g., through the structure of the housing 50), without the need for secondary lines or cables connecting the energy mechanism of the device with the cam member 34. This arrangement simplifies the design of the balance mechanism 30 and provides for more reliable operation.

The close proximity and cooperation of the spiral spring 60, the housing 50, and the cam member 34 in some embodiments also provides a compact balance mechanism that can be incorporated into a display positioning apparatus with minimal space impact. In some cases the size of the overall housing 50 is largely driven by the size of the spiral spring 60. For example, in some cases the housing may have a diameter that is 1-4" greater than the diameter of the spring and a width that is ½-3" greater than the width of the spring. In addition, the side-by-side positioning of the cam member 34 and the spiral spring 60 can concentrate the balance mechanism in a single location. The integrated configuration of the cam member 34, housing 50, and spiral spring 60 thus provides a self-contained balance mechanism 30 that can be easier to install and repair than individual components.

Figure 7:
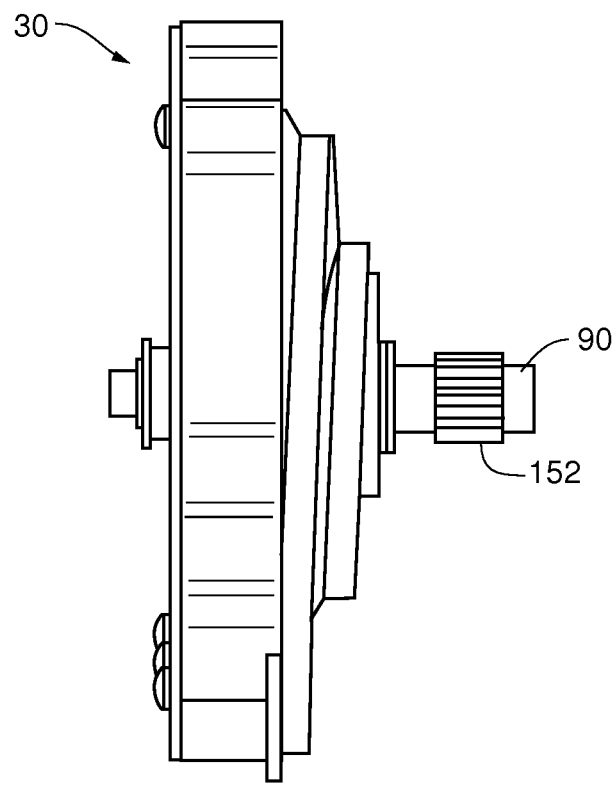
FIG. 7 is a side view of a balance mechanism and an axle in accordance with an embodiment of the invention.
Figure 8:
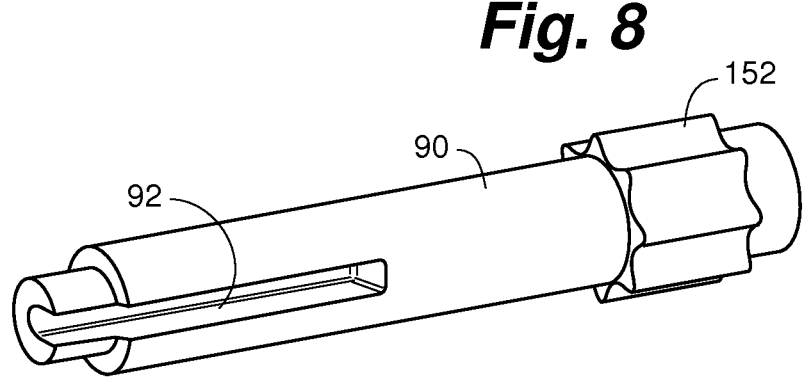
FIG. 8 is a perspective view of an axle in accordance with an embodiment of the invention.

FIG. 7 is a side view of the balance mechanism 30 mounted on an axle 90 in accordance with an embodiment of the invention. The axle 90 may further be mounted to a frame or otherwise supported by the display positioning apparatus. As shown in FIG. 8, in some embodiments the axle 90 includes a recess 92 configured to receive the second end 84 of the spiral spring 60. For example, the second bend 85 at the second end 84 of the spring may be inserted into the recess 92 to engage the spring with the axle 90. Thus, the axle 90 can maintain the second end 84 of the spring in a fixed position while the balance mechanism 30 rotates about the axle 90, enabling tightening and loosening of the spiral spring 60.

As will be appreciated from the description of the embodiments herein, certain embodiments of the invention provide an advantageous positioning of the spiral spring 60 and the cam member 34 within the display positioning apparatus. As perhaps best seen in FIGS. 3, 6, and 7, in some embodiments the spiral spring 60 is positioned coaxially with the cam member 34, with the axis of rotation of the cam member 34 being the center of the spiral spring 60. Such positioning allows the axle 90 to both rotatably support the cam member 34 and hold the second end 84 of the spiral spring 60 stationary with respect to the cam member 34. In addition, the flat, disk-like configuration of the spiral spring 60 allows the spring to be easily positioned side-by-side with the cam member 34, thus saving space and providing a more compact display positioning apparatus, especially when compared with devices employing extension springs, gas-powered springs, and the like.

Figure 9:
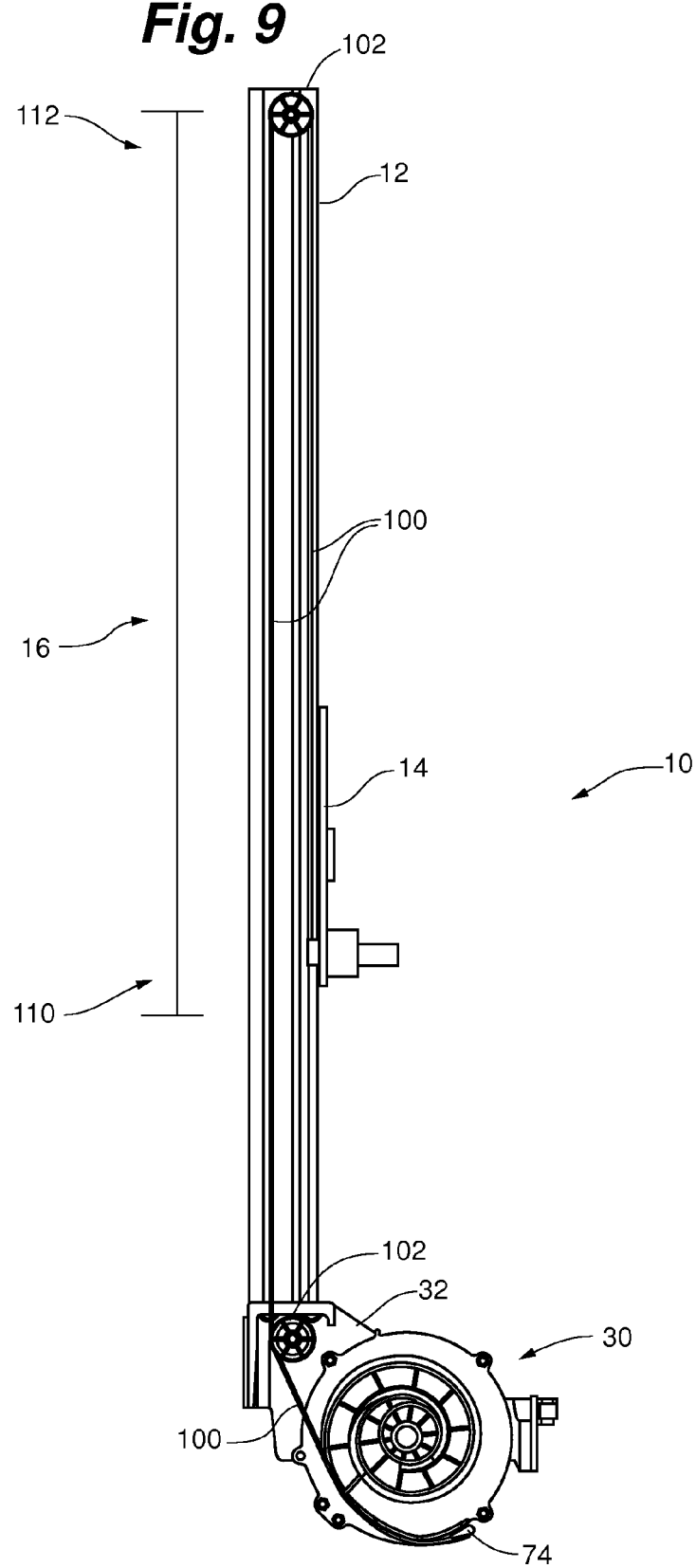
FIG. 9 is a cross-sectional view of a display positioning apparatus in accordance with an embodiment of the invention.

FIG. 9 is a cross-sectional view of the display positioning apparatus 10 shown in FIGS. 1A and 1B in accordance with an embodiment of the invention. As shown in FIG. 9, the display positioning apparatus 10 includes the support, which in this embodiment is formed as the lift column 12. The display positioning apparatus 10 also includes the bracket 14 adapted to couple with a display, the frame 32 mounted near the bottom of the lift column 12, and the balance mechanism 30 mounted within the frame 32 at the bottom of the lift column 12. An elongated tension member in the form of a line 100 is coupled to the bracket 14, and runs around two direction-changing pulleys 102 before reaching the balance mechanism 30. The line 100 is coupled to the cam member 34 (e.g., via the housing 50) via the attachment member 74, and thus transmits force between the balance mechanism 30 and the display bracket 14 as the bracket 14 moves through or is positioned within the range of travel 16.

Figure 10A:
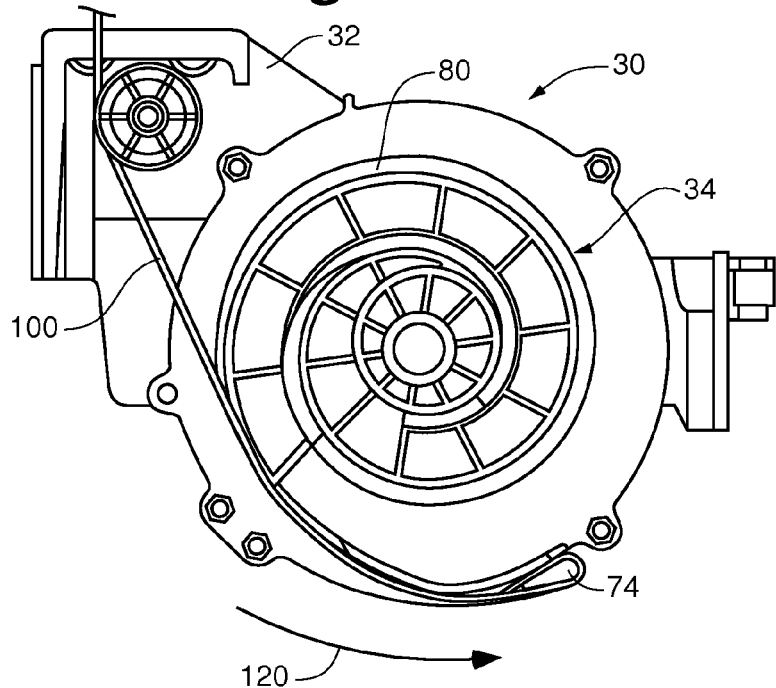
FIG. 10A is a partial cross-sectional view of a portion of the display positioning apparatus of FIG. 9 in accordance with an embodiment of the invention.
Figure 10B:
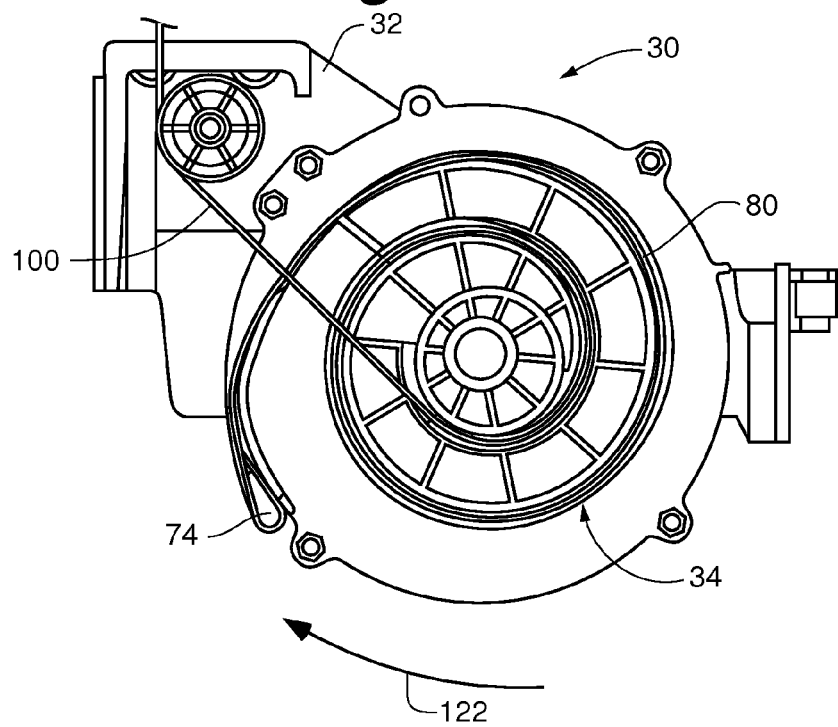
FIG. 10B is a partial cross-sectional view of a portion of the display positioning apparatus of FIG. 9 in accordance with an embodiment of the invention.

FIGS. 10A and 10B illustrate the balance mechanism 30 in two different angular orientations according to different positions of the display bracket 14 within the range of travel 16. FIG. 10A is a partial cross-sectional view of a portion of the display positioning apparatus 10 in accordance with an embodiment of the invention. As shown in detail, the line 100 is coupled with the cam member 34 via the attachment member 74. According to certain embodiments, the first angular orientation of the balance mechanism (i.e., the cam member and the spiral spring) shown in FIG. 10A corresponds to the display bracket 14 (and associated display) positioned near a first end 110 of the range of travel 16 (see FIG. 9). For example, when provided in a vertical configuration, the first angular orientation corresponds to the bracket/display being in a lowest position. Turning to FIG. 10B, a second angular orientation of the balance mechanism 30 corresponds to the display bracket 14 positioned near a second end 112 of the range of travel 16. The second end 112 may correspond to a highest position for a vertically-oriented display positioning apparatus.

Returning to FIG. 10A, operation of the display positioning apparatus will be described according to some embodiments. In the first angular orientation of FIG. 10A, the spiral spring 60 (not shown) is in a relatively coiled or tightened state, providing a biasing torque urging the cam member 34 to rotate in a first direction 120. As the balance mechanism 30 and cam member 34 rotate in a first direction 120, the cam surface 80 increasingly engages the line 100 and the cam member 34 winds the line 100 as it rotates. Thus, in this configuration, the cam member 34 winds the line to raise the display bracket 14 in the vertical direction. The spiral spring 60 unwinds and loosens to some extent in order to counterbalance the weight of the bracket and display as the cam member 34 rotates in the first direction 120.

Turning to FIG. 10B, the balance mechanism 30 is shown in a second angular orientation corresponding to the display bracket 14 near the highest portion of the vertical range of travel, with the line 100 wound around the cam surface 80. The weight of the bracket and/or display exerts a pulling force on the line 100, urging the cam member 34 to rotate in a second direction 122. As the cam member 34 rotates in the second direction 122, it engages the spiral spring 60 (not shown), thus tightening the spring 60 and providing a counterbalancing torque against the weight of the bracket/display. As previously discussed, in some embodiments the cam surface 80 of the cam member 34 interacts with the spring torque to provide a substantially constant counterbalancing force for the display and bracket 14 throughout the range of travel 16. In some embodiments this substantially constant counterbalancing force thus allows a user to position a display at any one of an infinite number of locations along the range of travel 16. Further, the balance mechanism can be used to maintain the desired position of the display, such that no locking mechanism must be engaged or disengaged before or after the display is moved to a new desired position.

Figure 11:
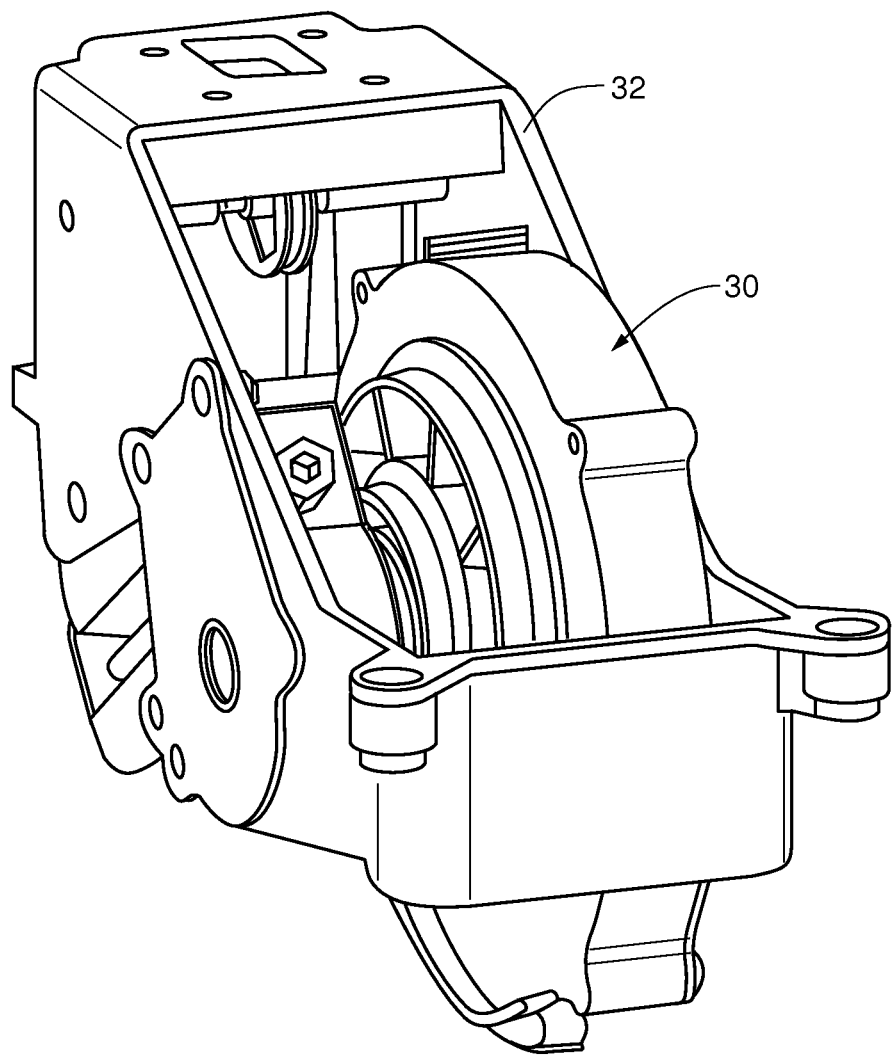
FIG. 11 is a perspective view of a frame and balance mechanism in accordance with an embodiment of the invention.

Accordingly, providing the display positioning apparatus 10 with the interacting cam member 34 and the spiral spring 60 provides a useful, versatile, and reliable balance mechanism 30. As illustrated in the figures thus far, the balance mechanism 30 is shown rotatably supported by a frame 32 attached to the lift column 12. FIG. 11 is a perspective view of the frame 32 and balance mechanism 30 in accordance with an embodiment of the invention. Those skilled in the art will appreciate that the frame 32 can be formed in a variety of configurations. In certain embodiments, the frame 32 merely provides rotational support for the balance mechanism 30 and couples the balance mechanism 30 to the lift column 12 or other support. Additional components and features may also be provided. For example, in certain embodiments a cover is provided about the frame 32 and balance mechanism 30 to provide a surface for engaging a support surface (e.g., a desk or floor) and to modify the ascetic appeal of the design.

Figure 12A:
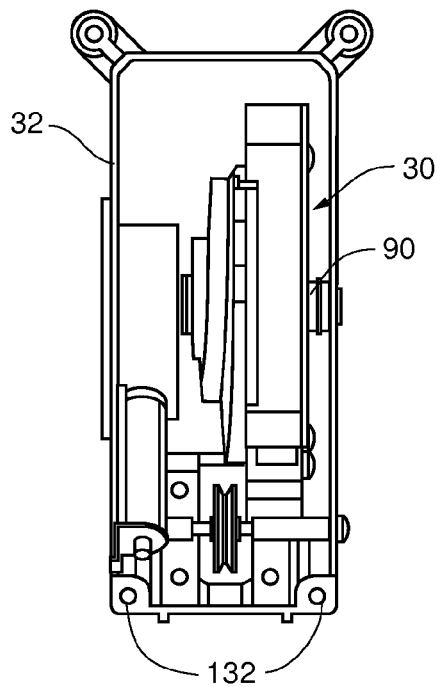
FIG. 12A is a bottom view of the frame and balance mechanism of FIG. 11 in accordance with an embodiment of the invention.
Figure 12B:
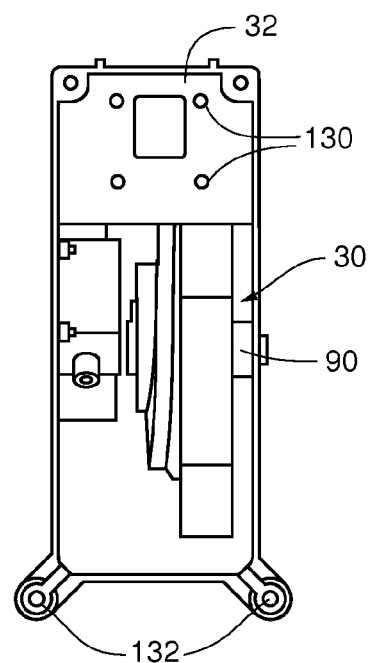
FIG. 12B is a top view of the frame and balance mechanism of FIG. 11 in accordance with an embodiment of the invention.
Figure 12C:
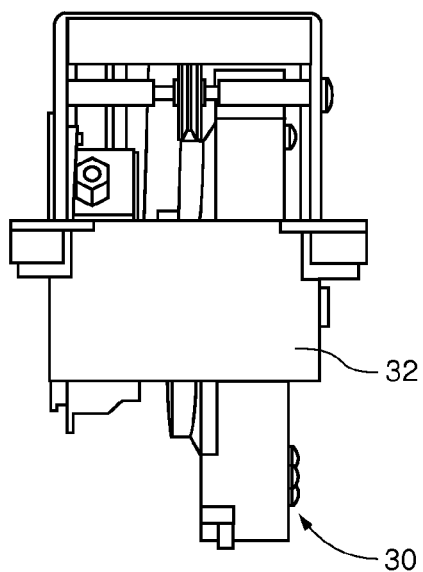
FIG. 12C is a front view of the frame and balance mechanism of FIG. 11 in accordance with an embodiment of the invention.
Figure 12D:
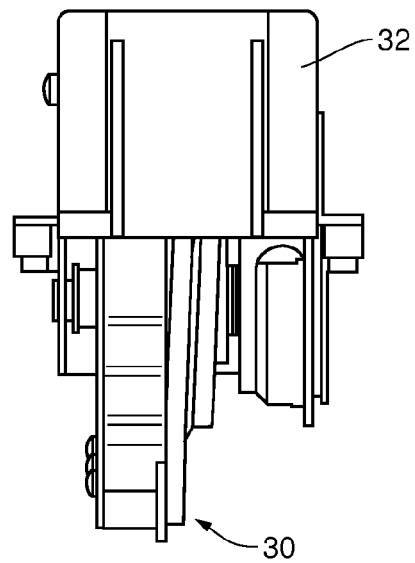
FIG. 12D is a back view of the frame and balance mechanism of FIG. 11 in accordance with an embodiment of the invention.

FIGS. 12A and 12B are bottom and top views, respectively, of the frame 32 and balance mechanism 30 of FIG. 11. FIGS. 12C and 12D are front and back views, respectively, of the frame 32 and balance mechanism 30. As shown and previously described, the balance mechanism 30 is rotatably supported about an axle 90 that is mounted to the frame 32. In some embodiments the frame 32 includes mounting structure 130 (e.g., mounting holes for bolts, screws or other fasteners) for coupling the frame to the lift column 12 or other support and/or mounting structure 132 for coupling the frame 32 with a cover or other outer housing.

In certain embodiments the display positioning apparatus (e.g., lift mechanism) includes one or more devices for adjusting the tension of the torquing spring member (e.g., the spiral spring 60). For example, in some cases a tensioning mechanism is provided that allows a user to adjustably rotate the axle 90 with respect to the frame 32, in order to adjust the tension of the spiral spring 60. The tensioning mechanism may be provided in a number of manners.

In one simple embodiment, the tensioning mechanism comprises a direct tensioning mechanism, such as providing the axle 90 with a spiraling thread that allows the axle 90 to be directly turned like a screw into the frame 32 or through the frame into a nut or other fastener. In some embodiments the axle 90 is coupled with a knob or lever for hand manipulation, while in some embodiments the axle 90 is provided with a drive head for a tool, such as a screw driver or ratchet. Turning the screw and axle allows adjustment of the tension of the spiral spring, e.g., for different load weights.

In some embodiments the tensioning mechanism includes a gear mechanism coupled with the second end 84 of the spring 60 via the axle 90. For example, turning to FIG. 13A, in some embodiments a disk gear 150 including a number of teeth around a periphery of the gear is attached to the axle 90 for turning the axle 90. As shown in FIG. 8 and in FIG. 13B, in some embodiments the axle 90 is provided with an integral gear member 152 and the disk gear 150 engages the axle 90 by engaging the integral gear member 152. The disk gear 150 can thus be used for adjusting the tension of the spiral spring 60 in order to accommodate different loads.

In some embodiments the disk gear 150 may be controllably rotated by a secondary gear. For example, in the embodiment shown in FIGS. 13A and 13B, a lead screw or worm gear 154 engages the disk gear 150 to provide measured rotation of the disk gear 150 in order to adjustably rotate the axle 90 and adjust the tension of the spiral spring 60. In certain embodiments the worm gear 154 includes a drive head 156 configured to allow a tool (e.g., a screw driver, ratchet, etc.) to turn the worm gear 154. In some embodiments the worm gear 154 is provided with a knob or lever for hand manipulation. Accordingly, in some embodiments a gear mechanism including the disk gear 150 and the worm gear 154 provides controlled and measured adjustment of the tension of the spiral spring 60. In addition, the engagement of the worm gear and disk gear fixes rotation of the disk gear 150 and axle 90, thus holding the second end 84 of the spiral spring 60 stationary as the cam member 34 and housing 50 rotate about the axle 90.

In certain embodiments the tensioning mechanism includes a limiting mechanism to ensure that the spiral spring 60 is not over-tensioned. For example, in some cases the gear mechanism shown in FIGS. 13A and 13B includes a threaded shaft 160 coupled to the worm gear 154 (threading not shown in FIGS. 13A and 13B). The shaft 160 is movably mounted within a retaining bracket 162 and includes a stop bracket 164 coupled to the shaft. As the worm gear 154 is turned to tighten and loosen the tension of the spiral spring 60, the stop bracket 164 travels up and down the threaded shaft 160. As the tensioning mechanism reaches its tension limit and/or a relaxation limit, the stop bracket 164 engages the retaining bracket 162 and prevents further rotation of the worm gear 154, the disk gear 150 and the axle 90. In some cases the stop bracket 164 is configured as an indicator to show a user how much tension has been applied to the spiral spring 60.

Figure 13A:
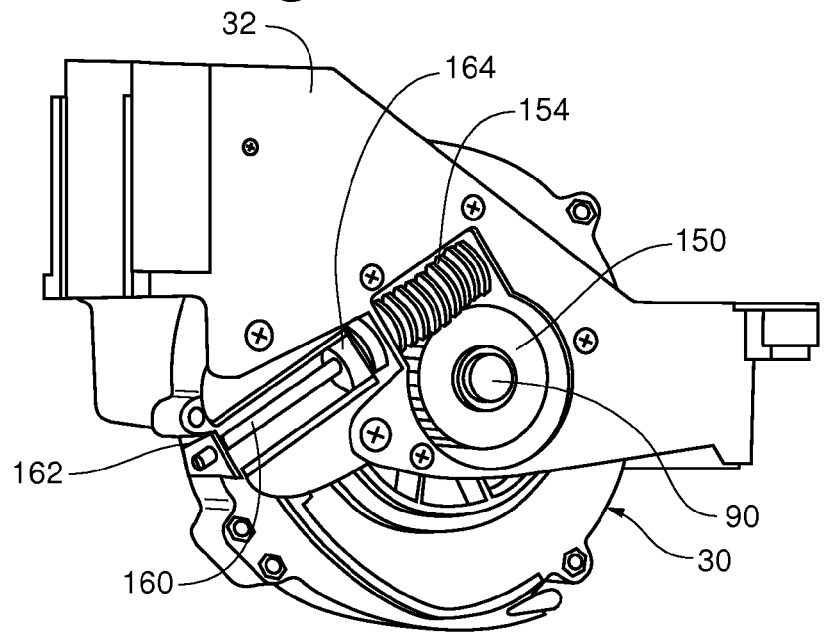
FIG. 13A is a perspective view of a tensioning mechanism in accordance with an embodiment of the invention.
Figure 13B:
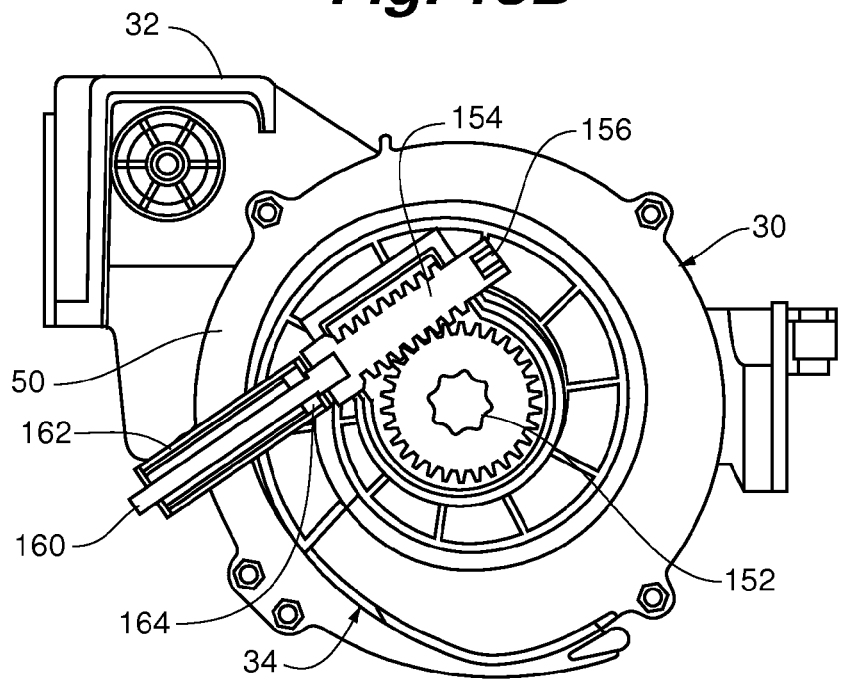
FIG. 13B is a partial cross-sectional view of the tensioning mechanism of FIG. 13A in accordance with an embodiment of the invention.
Figure 14:
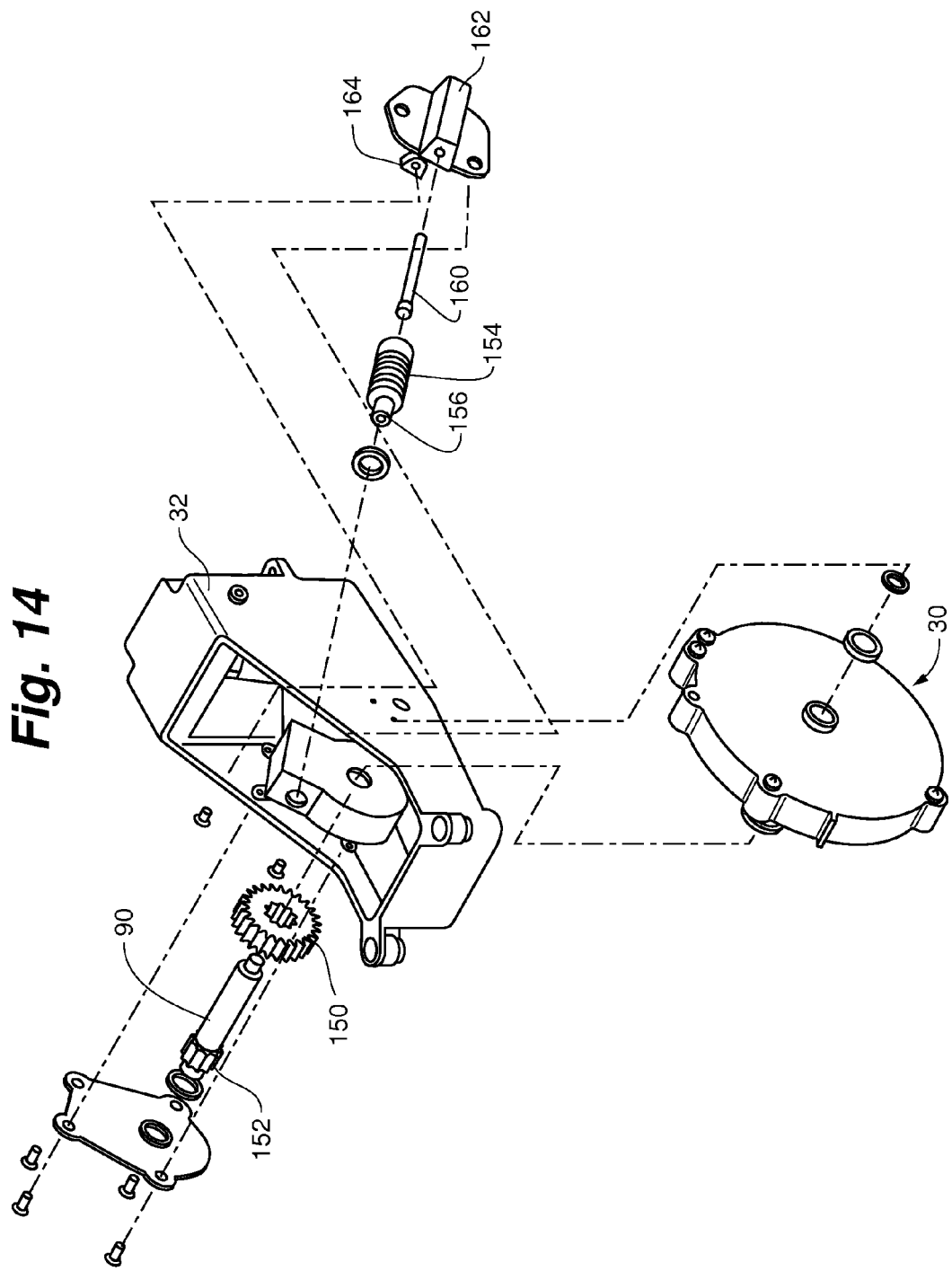
FIG. 14 is an exploded assembly view of the tensioning mechanism of FIG. 13A in accordance with an embodiment of the invention.

FIG. 14 illustrates an exploded assembly view of the frame 32, balance mechanism 30, and tensioning mechanism, including the axle 90, disk gear 150, and worm gear 154 shown in FIGS. 13A and 13B.

Figure 15A:
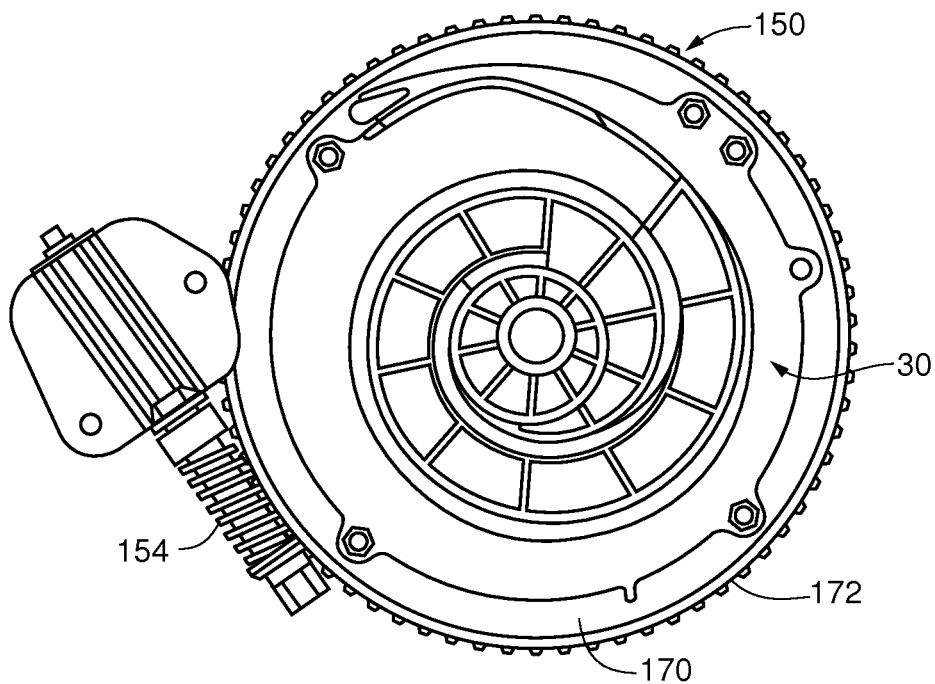
FIG. 15A is a view of a balance mechanism and a tensioning mechanism in accordance with an embodiment of the invention.
Figure 15B:
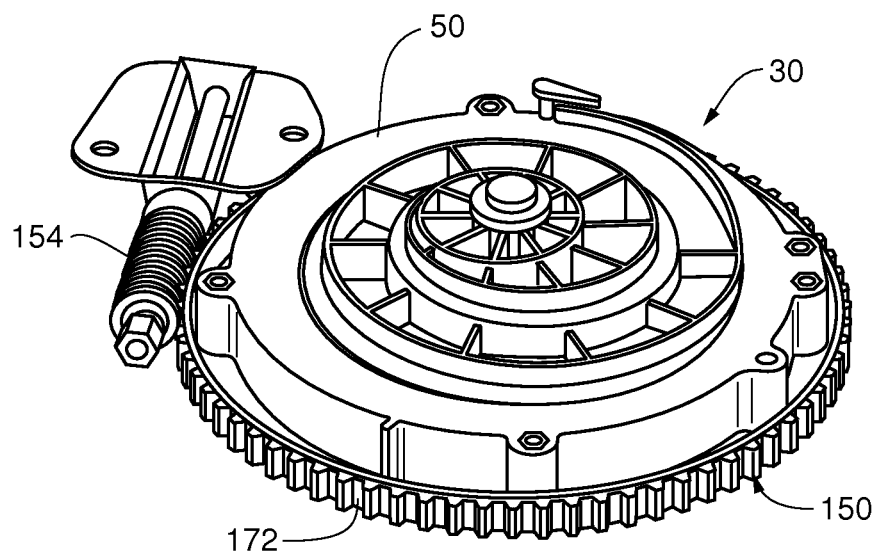
FIG. 15B is a perspective view of the balance mechanism and tensioning mechanism of FIG. 15A in accordance with an embodiment of the invention.

FIGS. 15A and 15B illustrate another tensioning mechanism in accordance with an embodiment of the invention. In this case, the disk gear 150 comprises a plate member 170 with a diameter extending beyond the diameter of the balance mechanism 30. The disk gear 150 further includes a cylindrical wall 172 having a plurality of teeth for engaging the worm gear 154. The cylindrical wall 172 and teeth extend around the housing of the balance mechanism 30, thus allowing the worm gear 154 to engage the disk gear 150 in roughly the same plane as the balance mechanism 30. Such a configuration can provide a relatively thin profile for the balance mechanism, allowing the balance mechanism 30 to be installed in relatively thin and flat cavities. In contrast, the tensioning mechanism shown in FIGS. 13A and 13B is configured to engage the balance mechanism 30 at its side, thus providing a wider profile, but a smaller overall diameter for the balance mechanism 30 and tensioning mechanism. Accordingly, either configuration may be useful depending upon the size constraints of a particular embodiment.

Another advantage of the balance mechanism 30 according to some embodiments is that the balance mechanism can be mounted in a variety of orientations while still providing effective and reliable operation. For example, referring to FIGS. 1A and 1B, in some embodiments the balance mechanism 30 is positioned with respect to the lift column 12 such that the cam member 34 and the spiral spring 60 rotate within planes substantially parallel to the length of the lift column 12. Assuming the display positioning apparatus 10 is vertically-oriented to provide lift assistance, the cam member 34 and the spiral spring 60 are also oriented vertically. Such a configuration can provide a relatively narrow profile for the display positioning apparatus 10.

Figure 16C:
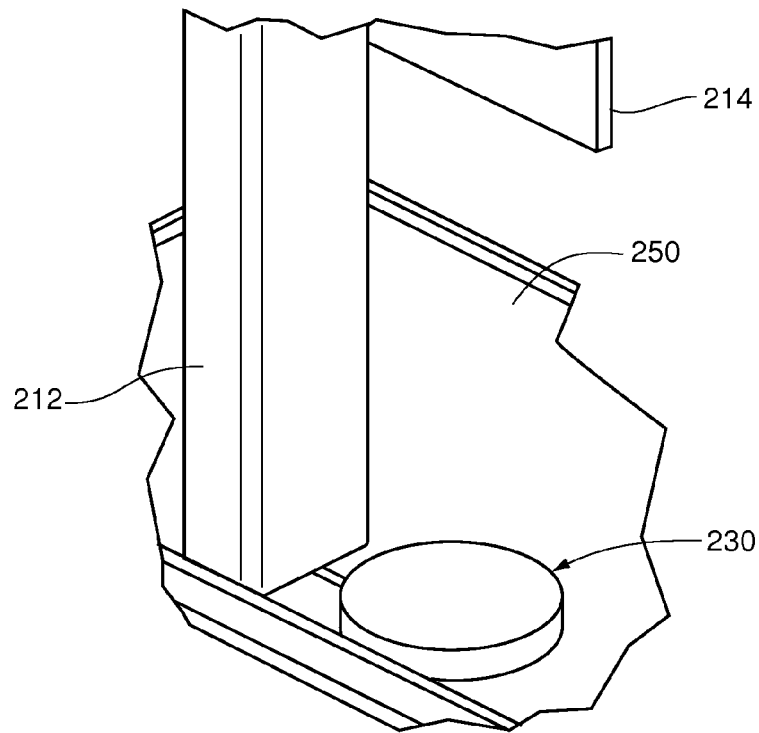
FIG. 16C is a perspective view of a portion of the display positioning apparatus of FIG. 16A in accordance with an embodiment of the invention.
Figure 16D:
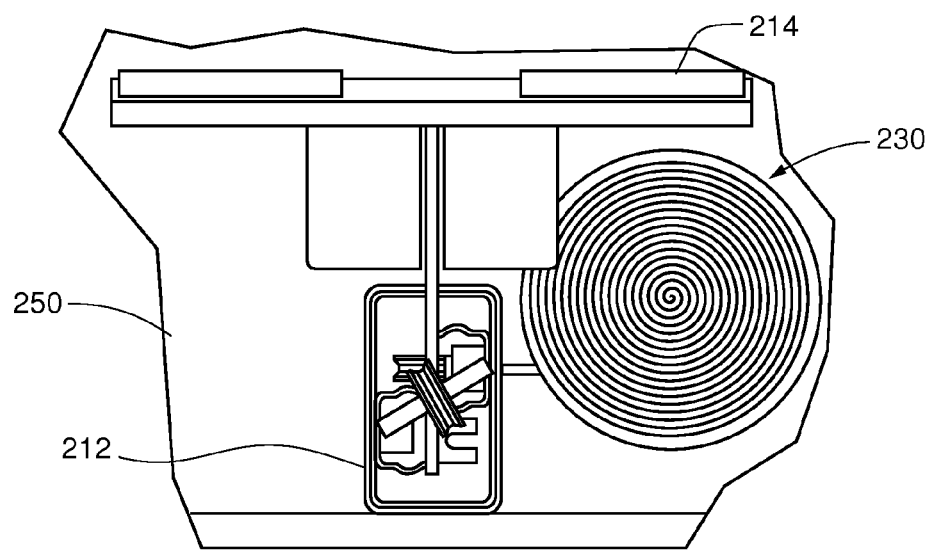
FIG. 16D is a top of the display positioning apparatus of FIG. 16A in accordance with an embodiment of the invention.

FIGS. 16A-16D show various views of a display positioning apparatus 200 including a balance mechanism 230 positioned relatively flat with respect to a lift column 212. The display positioning apparatus 200 includes a support, or lift column 212 and a bracket 214 movably coupled to the lift column 212. The balance mechanism 230 is positioned within a base 250 of the display positioning apparatus 200. Thus, the cam member 234 and the spiral spring 260 (shown schematically) rotate within planes substantially perpendicular to the length of the lift column 212, and rotate about a generally vertical axis. As seen in FIGS. 16A and 16C, this orientation allows the balance mechanism 230 to be positioned within the relatively flat and thin base 250. In some cases a tensioning mechanism (not shown) such as that shown in FIGS. 15A and 15B may be used to maintain a relatively thin profile while allowing adjustability of the spring tension.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A lift mechanism for positioning a display, comprising:
a lift column;
a bracket movably engaged with the lift column through a range of travel, the bracket adapted to couple with a display to move the display along the range of travel;
an elongated tension member coupled to the bracket;
a cam member coupled to the tension member and rotatably supported with respect to the lift column, the cam member having a cam surface for winding the tension member as the cam member rotates in a first direction, and for unwinding the tension member as the cam member rotates in a second direction; and
a torquing spring member engaged with the cam member, the torquing spring member providing a torque opposing rotation of the cam member to counterbalance the bracket and the display along the range of travel,
wherein the torquing spring member is positioned coaxially with the cam member.

2. The lift mechanism of claim 1, wherein the torquing spring member comprises a spiral spring.

3. The lift mechanism of claim 2, wherein the spiral spring tightens as the cam member rotates in the second direction and loosens as the cam member rotates in the first direction.

4. The lift mechanism of claim 2, wherein the spiral spring comprises a wire wound in a spiral from a center of the spiral spring to an outer diameter of the spiral spring and wherein the outer diameter of the spiral spring is engaged with the cam member and the cam member rotates relative to the center of the spiral spring.

5. The lift mechanism of claim 2, wherein the lift column has a length and the cam member and the spiral spring rotate within planes parallel to the length of the lift column.

6. The lift mechanism of claim 2, wherein the lift column has a length and the cam member and the spiral spring rotate within planes perpendicular to the length of the lift column.

7. The lift mechanism of claim 1, wherein the cam surface comprises a spiraling surface.

8. The lift mechanism of claim 1, wherein the cam surface extends through an angle of 360 degrees or more.

9. The lift mechanism of claim 1, further comprising a base coupled to the lift column, wherein the cam member and the torquing spring member are positioned within the base.

10. The lift mechanism of claim 1, further comprising means for adjusting a tension of the torquing spring member.

11. A lift mechanism for positioning a display, comprising:
a lift column;
a bracket movably engaged with the lift column through a range of travel, the bracket adapted to couple with a display to move the display along the range of travel;
an elongated tension member coupled to the bracket; and
a balance mechanism rotatably supported with respect to the lift column, the balance mechanism counterbalancing the bracket to position the bracket and the display along the range of travel, the balance mechanism comprising a housing containing a torquing spring member having a first end engaged with the housing and a second end rotatable with respect to the housing, the housing coupled to the tension member and having a cam surface engaging the tension member as the housing rotates with respect to the lift column.

12. The lift mechanism of claim 11, further comprising a gear mechanism coupled to the second end of the torquing spring member for adjusting a tension of the torquing spring member.

13. The lift mechanism of claim 12, further comprising a frame coupled to the lift column and an axle coupled to the frame, wherein the housing rotates about the axle and the gear mechanism is coupled to the second end of the torquing spring member through the axle.

14. The lift mechanism of claim 13, wherein the gear mechanism comprises a disk gear coupled to the axle and a worm gear engaged with the disk gear.

15. The lift mechanism of claim 14, further comprising a limiting mechanism coupled with the gear mechanism to prevent over-tensioning of the torquing spring member.

16. The lift mechanism of claim 15, wherein the limiting mechanism comprises a shaft coupled to the worm gear and a retaining bracket, wherein the shaft is movably mounted in the retaining bracket and a stop bracket coupled to the shaft restricts movement of the shaft with respect to the retaining bracket.

17. The lift mechanism of claim 14, wherein the disk gear comprises a plate member coupled with a cylindrical wall having a plurality of teeth, the cylindrical wall extending around the housing of the balance mechanism.

18. The lift mechanism of claim 12, wherein the gear mechanism includes a tension indicator.

* * * * *